S. PEACOCK.
PROCESS OF PRODUCING CARBONITRIDS.
APPLICATION FILED FEB. 14, 1912.
1,137,524.
Patented Apr. 27, 1915.
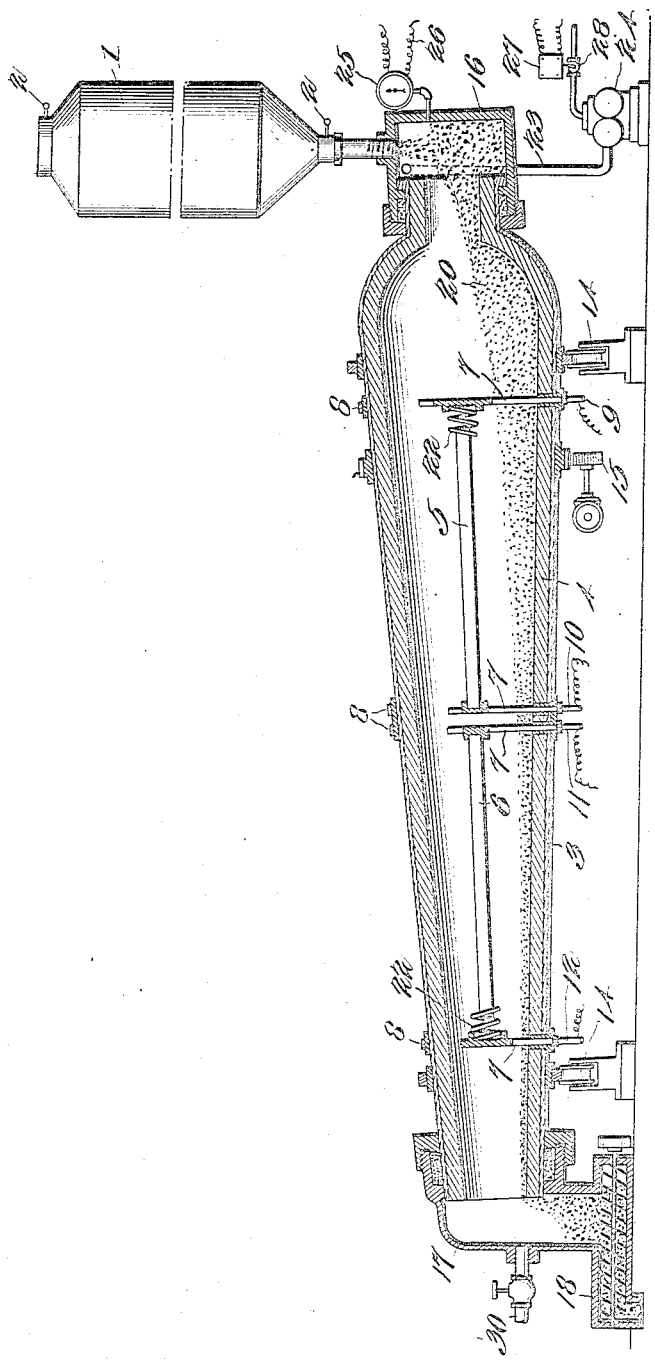
Inventor.
S. Peacock,
Witnesses
Attorneys

UNITED STATES PATENT OFFICE.

SAMUEL PEACOCK, OF CHICAGO, ILLINOIS, ASSIGNOR TO E. I. DU PONT DE NEMOURS POWDER COMPANY, OF WILMINGTON, DELAWARE, A CORPORATION OF NEW JERSEY.

PROCESS OF PRODUCING CARBONITRIDS

1,137,524.  Specification of Letters Patent.  Patented Apr. 27, 1915.

Application filed February 14, 1912. Serial No. 677,543.

*To all whom it may concern:*

Be it known that I, SAMUEL PEACOCK, a citizen of the United States, residing at Chicago, in the county of Cook and State of Illinois, have invented certain new and useful Improvements in Processes of Producing Carbonitrids; and I do hereby declare the following to be a full, clear, and exact description of the invention, such as will enable others skilled in the art to which it appertains to make and use the same.

This invention relates to a process for producing a composition of matter, which I believe to be a carbo-nitrid containing a metal chemically combined with carbon and nitrogen, and has for its object to chemically fix nitrogen in a manner more expeditious and at a less cost than those methods heretofore proposed.

I may use oxids of almost any of the metals, but I prefer the oxids of aluminum or of silicon, or of the alkali-earth metals calcium and magnesium to mix with the carbon and nitrogen; and as an example of the process I will employ for convenience, the oxid of calcium in disclosing the invention. The exact structural formula of my new compound is not at present known to me, but I believe its general formula, when calcium is employed, approximates $Ca_3C_3N_6$; and I believe it to be a double nitrid of calcium and carbon as expressed by the formula

which is a carbo-nitrid compound analogous to the well known double sulfids, an example of which is found in chalcopyrite

all as will be more fully disclosed hereinafter.

With the above and other objects in view, the invention consists in the novel steps constituting my process as well as the new carbo-nitrid compound itself, all as will more fully appear hereinafter, and be particularly pointed out in the claims.

Referring to the accompanying drawings forming a part of this specification in which the figure is a diagrammatic view of one form of furnace suitable for carrying out my invention:—1 indicates any suitable supply for the mixed carbon and lime, 2 valves controlling the same, 3 a furnace provided with a refractory lining 4, 5 a resistor of graphite or other suitable material, 6 a second resistor, 7 supports for said resistor, 8 rings on the outside of the furnace connected with said supports 7 and adapted to make contact with the brushes 9, 10, 11 and 12 included in suitable electric circuits not shown.

The furnace is supported by any suitable means as for example, the rollers 14, and is revolved as by the means 15.

16 represents an air-tight connection between the receptacle 1 and the larger end of the furnace, while 17 represents a similar connection between the exit 18 and the smaller end of the furnace.

The shape of the furnace is preferably conical with its lower side horizontal, and when rotated it therefore carries the material 20 in small particles upwardly on its inner side, and drops the same down at a point nearer the smaller end than it was before. In this way, the material is continuously fed through and evenly heated in the furnace as it rotates.

In order to allow for the expansion and contraction of the resistors, I preferably provide spring supports 22 which may be suitably made of carbon or other refractory conducting substance.

23 represents a suction pipe for the pump 24, which communicates with the interior of the connection 16 as shown, and 25 represents a suitable vacuum gage, which is provided with contacts, not shown, connecting with the wires 26.

27 represents any suitable electro-magnetic device adapted to be operated from the gage 25 and controlling the exit valve 28 of the pump, although my process may be carried out at atmospheric pressure, or even above if desired, so long as the partial pressures of the gaseous products of the reaction do not exceed 760 mm. of mercury.

Since the above apparatus forms no part of my present invention, I do not deem it necessary to disclose more of its details, and only refer to it here in order to make clearer the process now to be described. Briefly stated, this process consists in taking advantage of the relation which exists between the equilibrium temperature and pressure of the formation of the calcium carbonitrid, $Ca_3C_3N_6$, and preferably in causing said carbonitrid to form at a temperature in the neighborhood of 1400° to 1600° centigrade, while the partial pressure of the gaseous products of the reaction in the furnace is below that of the atmosphere.

In carrying out my process, I remove any gaseous oxygen that may exist in the furnace and take finely divided and dry calcium oxid CaO, and finely divided dry carbon, preferably coke or charcoal, in the ratio of 56 parts by weight of the former to 24 parts of the latter, thoroughly mix the same, and feed the mixture into the furnace as illustrated. I find in practice that the process is facilitated if an excess of carbon sometimes as high as 25 or 30 per cent. is used, since it prevents the formation of calcium nitrids $Ca_3N_2$, which contain a much lower percentage of nitrogen than do the carbonitrids of my process. Said excess of carbon also insures the more nearly complete conversion of the calcium to the carbo-nitrid form, said excess of carbon not being injurious to the process.

After the mixed calcium oxid and carbon is in the furnace, I preferably subject it under the conditions above mentioned, by means of the resistor 5 to a temperature of about 1500° C., which effects the formation of the carbo-nitrid in accordance with the following equation:—

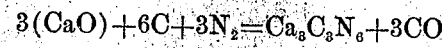
$$3(CaO) + 6C + 3N_2 = Ca_3C_3N_6 + 3CO$$

As the carbo-nitrid, however, is formed and the material fed by the furnace under the electrode 6, less total heat units are required to keep up the reaction temperature, because the reaction lessens in velocity and less heat is absorbed. Therefore, I preferably include the resistor 6 in an independent circuit, and pass only sufficient current therethrough to supply the necessary heat in the furnace to correspond with the selected pressure of gas that is being maintained. The material is next cooled and discharged from the furnace by any suitable means.

Any carbon monoxid CO which may be liberated from the charge, will be forced forward by the nitrogen, as well as sucked forward by the pump, and therefore it will not contact with the carbo-nitrid in sufficient proportions to cause any damage.

The gas connections, of course, must be sufficiently large to supply nitrogen fast enough to satisfy the reaction.

It will be observed that my product $Ca_3C_3N_6$ contains six atoms of nitrogen to three atoms of calcium, whereas if I allowed the formation of calcium nitrid, $Ca_3N_2$ to take place, only two atoms of nitrogen would be fixed to three atoms of calcium.

The above carbo-nitrid compound I do not believe is a cyano-nitrid, or a cyanamid, for cyanogen, CN, cannot be derived from it except by means of fusion, which involves a breaking up of the structure in a manner similar to the breaking up of nitrogenous organic products such as leather, horns, etc., which, as is well known, only produce cyanogen upon the application of a destructive temperature.

In carrying out the process, it is important that any air which may exist in the furnace, be removed prior to the admission therein of nitrogen, and also that the said partial pressure of the evolved carbon monoxid be prevented from rising to such an extent as would interfere with the reaction.

The temperatures required for the reaction will vary with the metal oxid used; for calcium oxid it will be about 1500° C., as above stated; for aluminum oxid it will be about 1700° C.; for silicon oxid about 1800° C., and for magnesium oxid about 1600° C. These temperatures in each case will also vary with the partial pressures of the gaseous products of the reaction in the furnace. I prefer to prevent in all cases, the said partial pressures of the products of the reactions, from rising above 300 mm. of mercury, although of course, I may operate the process at any partial pressure that is substantially less than 760 mm. of mercury. The reaction velocity, as well as the temperature of reaction, of course, diminishes with the partial pressure of the products of the reaction, and I find if I use a partial pressure of say 250 mm., 350 mm., or 500 mm., the reaction is satisfactory.

An ultimate analysis shows my carbonitrid $Ca_3N_2.C_3N_4$ to resemble calcium cyanamid, but to be very different in structure, since it does not contain the cyanogen radical CN. It can also be produced without the intermediary of calcium carbid $CaC_2$, since said carbid could not be formed under the conditions and temperatures which produce my carbo-nitrid.

I find that in boiling water or acids my carbo-nitrid is decomposed into ammonia $NH_3$ and carbonates, or into ammonium and metal salts of the acid used. For example:—

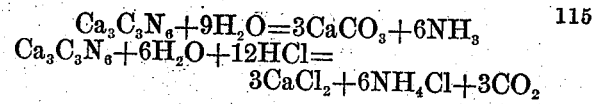
$$Ca_3C_3N_6 + 9H_2O = 3CaCO_3 + 6NH_3$$
$$Ca_3C_3N_6 + 6H_2O + 12HCl = 3CaCl_2 + 6NH_4Cl + 3CO_2$$

In other words, my compound clearly appears to be a double nitrid, formed under conditions imposing no abnormal valencies, for taken separately the nitrids exhibit the normal valencies thus:—

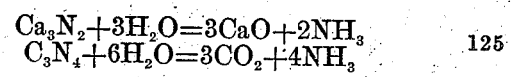
$$Ca_3N_2 + 3H_2O = 3CaO + 2NH_3$$
$$C_3N_4 + 6H_2O = 3CO_2 + 4NH_3$$

As stated above, the oxids of aluminum and of silicon, may be substituted in the above disclosure for the oxid of calcium. In other words, instead of employing 3CaO in the reaction producing my carbo-nitrid, I may employ $3Al_2O_3$, which will produce an aluminum carbo-nitrid having the formula $$Al_6N_6(C_3N_4)_3.$$

And, by employing $3SiO_2$ instead of $3CaO$ in said reaction, I may produce a silicon carbo-nitrid $Si_3N_4.(C_3N_4)_2$. Of course the oxids of other metals may be similarly substituted for the calcium oxid with correspondingly different carbo-nitrids.

In all cases the products have similar properties and fail to produce cyanogen CN, except upon a breaking up of the compound.

It is evident that those skilled in the art may vary the above process without departing from the spirit of my invention, and therefore, I do not wish to be limited to this disclosure except as may be required by the claims.

What I claim is:—

1. The process of producing a carbo-nitrid, which consists in heating in the presence of nitrogen an oxid of an element having metallic properties with sufficient carbon and to a temperature sufficient to produce said carbo-nitrid, while preventing the partial pressures of the gaseous products of the reaction from rising sufficiently to interfere with the reaction, substantially as described.

2. The process of producing a carbo-nitrid, which consists in heating an oxid of an element having metallic properties in the presence of nitrogen with sufficient carbon and to a temperature sufficient to produce said carbo-nitrid, while maintaining the partial pressures of the gaseous products of the reaction below 500 millimeters of mercury, substantially as described.

3. The process of producing a carbo-nitrid, which consists in heating an oxid of an element having metallic properties in the presence of nitrogen with sufficient carbon and to a temperature sufficient to produce said carbo-nitrid, while maintaining the partial pressure of the gaseous products of the reaction below 350 millimeters of mercury, substantially as described.

4. The herein described composition of matter consisting of a carbo-nitrid containing a metal chemically combined with carbon and nitrogen, but failing to evolve cyanogen $(CN)_2$ except upon fusion, substantially as described.

In testimony whereof, I affix my signature, in presence of two witnesses.

SAMUEL PEACOCK.

Witnesses:
A. S. COUTURIER,
J. F. FENNIG.